United States Patent
Marcilly et al.

(10) Patent No.: US 6,198,015 B1
(45) Date of Patent: *Mar. 6, 2001

(54) CATALYST BASED ON A MOLECULAR SIEVE AND A PROCESS FOR SELECTIVE HYDROISOMERISATION OF LONG LINEAR AND/OR SLIGHTLY BRANCHED PARAFFINS USING THAT CATALYST

(75) Inventors: Christian Marcilly, Houilles; Eric Benazzi, Chatou; Nathalie George-Marchal, Paris, all of (FR)

(73) Assignee: Institut Francais du Petrole (FR)

(*) Notice: Subject to any disclaimer, the term of this patent is extended or adjusted under 35 U.S.C. 154(b) by 0 days.

This patent is subject to a terminal disclaimer.

(21) Appl. No.: 09/034,350

(22) Filed: Mar. 4, 1998

(30) Foreign Application Priority Data

Mar. 5, 1997 (FR) .................................................. 97 02598

(51) Int. Cl.$^7$ ................................. C07C 5/13; B01J 29/04
(52) U.S. Cl. .......................... 585/739; 585/740; 585/750; 502/61; 502/64; 502/73; 502/74
(58) Field of Search .................................. 585/739, 740, 585/750; 502/61, 64, 73, 74

(56) References Cited

U.S. PATENT DOCUMENTS 5,135,638 * 8/1992 Miller ..................................... 208/27
5,282,958 * 2/1994 Santilli et al. ......................... 208/111

FOREIGN PATENT DOCUMENTS

| 0 065 400 | 11/1982 | (EP) . |
| 0 103 981 | 3/1984 | (EP) . |
| 92/01657 | 2/1992 | (WO) . |
| 97/09397 | 3/1997 | (WO) . |

* cited by examiner

Primary Examiner—Benjamin L. Utech
Assistant Examiner—Tam M. Nguyen
(74) Attorney, Agent, or Firm—Millen, White, Zelano & Branigan, P.C.

(57) ABSTRACT

The invention concerns a process for selective hydroisomerization of compounds with an n-alkane chain containing more than 10 carbon atoms, in which the compound to be treated is brought into contact with a catalyst comprising at least one hydro-dehydrogenating element and at least one molecular sieve having a one- or two-dimensional pore network, the accessible pore openings of which are delimited by 10 oxygen atoms, and a distance termed the bridging distance between the pores of less then 0.70 nm, and the zeolite is such that a catalyst which undergoes a standard n-heptadecane isomerization test has, for a conversion of 95%, a selectivity of at least 70% for isomerized products, and the catalyst contains at least 5% by weight of at least one hydro-dehydrogenating element selected from the group formed by non noble GVIII metals, GVIB metals, and niobium, and the catalyst preferably contains phosphorous.

The sieve is preferably a NU-10, NU-23, NU-87, EU-13 or Theta-1 zeolite.

11 Claims, No Drawings

CATALYST BASED ON A MOLECULAR SIEVE AND A PROCESS FOR SELECTIVE HYDROISOMERISATION OF LONG LINEAR AND/OR SLIGHTLY BRANCHED PARAFFINS USING THAT CATALYST

The present invention is an improvement of French patent applications FR-95/10425 and FR-95/10424 filed on Sep. 6, 1995, and relates to a catalyst and a selective hydroisomerisation process for long (more than 10 carbon atoms) linear and/or slightly branched paraffins, in particular for high yield conversion feeds with high pour points to at least one cut having a low pour point and a high viscosity index.

PRIOR ART

High quality lubricants are of fundamental importance for proper operation of modern machines, cars and trucks. However, the quantity of paraffins originating directly from petroleum, which have not been treated, and with properties which are suitable for good lubricants is very low with respect to the increasing demand in this sector.

Treatment of heavy petroleum fractions with high concentrations of linear or slightly branched paraffins is necessary to obtain good quality lubricant stock in the best possible yields, using a dewaxing operation which aims to eliminate linear or very slightly branched paraffins from feeds which are then used as lubricant stock or kerosine or jet fuel. High molecular weight paraffins which are linear or very slightly branched and which are present in oils or in kerosine or jet fuel result in high pour points and thus coagulation on low temperature use. In order to reduce the pour points, such linear paraffins which are not or very slightly branched must be completely or partially eliminated.

The dewaxing operation can be carried out by extraction using solvents such as propane or methyl ethyl ketone, known as propane or methyl ethyl ketone (MEK) dewaxing. However, such techniques are expensive, long and not always easy to carry out.

Catalytic dewaxing, so named to differentiate it from solvent dewaxing, is cheaper and can produce products with the desired physico-chemical properties. This is achieved by selective cracking of the longest linear paraffin chains leading to the formation of lower molecular weight compounds, part of which can be eliminated by distillation.

Zeolites are among the most widely used dewaxing catalysts because of their shape selectivity. The concept behind their use is that zeolitic structures exist with pore openings which allow long linear or very slightly branched paraffins to enter their micropores but which exclude branched paraffins, naphthenes and aromatics. This phenomenon results in selective cracking of linear or very slightly branched paraffins.

Catalysts based on zeolites with intermediate pore sizes such as ZSM-5, ZSM-11, ZSM-12, ZSM-22, ZSM-23, ZSM-35 and ZSM-38 have been described for their use in processes for catalytic dewaxing by cracking.

Processes using such zeolites enable dewaxing by cracking feeds containing less than 50% by weight of linear or very slightly branched paraffins. However, with feeds containing larger quantities of such compounds, it appears that cracking thereof results in the formation of large quantities of lower molecular weight products such as butane, propane, ethane and methane, which considerably reduces the yield of desired products.

In order to overcome these disadvantages, we have concentrated our research resources on developing catalysts (preferably not ZSM) which can isomerise such compounds.

A number of patents exist in this field, for example International patent application WO 92/01657 describes and claims a process for dewaxing feeds by means of an isomerisation reaction in the presence of a group VIII metal, a hydrogen pressure in the range 100 KPa to 21000 KPa and a catalyst with a pore opening in the range 0.48 nm to 0.71 nm and in which the crystallite size is less than 0.5 $\mu$m. The performance of that catalyst was improved in terms of yield, compared with the prior art.

AIM OF THE INVENTION

The invention provides a catalyst comprising a matrix, at least 5% of at least one hydro-dehydrogenating element selected from the group formed by non noble GVIII metals, GVIB metals, and niobium, and at least one molecular sieve with a one- or two-dimensional pore network, the accessible pore openings of which being delimited by 10 oxygen atoms, and a distance termed the bridging distance between the pores being less than 0.70 nm, and the zeolite is such that the catalyst constituted by the zeolite and 0.5% by weight of platinum when subjected to a standard n-heptadecane isomerisation test has a selectivity for isomerised products of at least 70% for a conversion of 95%.

The invention also provides a process for selective hydroisomerisation of compounds with at least one n-alkane chain containing more than 10 carbon atoms, in which the compound to be treated is brought into contact with a catalyst of the invention.

This process can advantageously convert a feed with a high pour point to a mixture with a lower pour point and a high viscosity index.

The feed includes, inter alia, linear and/or slightly branched paraffins containing at least 10 carbon atoms, preferably 15 to 50 carbon atoms, advantageously 15 to 40 carbon atoms.

The process comprises using a catalyst comprising at least one molecular sieve with at least one pore type in which the opening is delimited by 10 oxygen atoms and which are the largest pores in the structure which are accessible from the exterior. The pore network of the zeolite is one- or two-dimensional, preferably one-dimensional.

The bridging distance between two pore openings (with 10 oxygen atoms), as defined above, is less than 0.70 nm (1 nm=$10^{-9}$ nm), preferably in the range 0.50 nm to 0.68 nm, more preferably in the range 0.52 nm to 0.65 nm. The crystallite size is preferably less than 2 $\mu$m (1$\mu$m=$10^{-6}$ m), advantageously less than 1 $\mu$m, and preferably 0.4 $\mu$m.

The zeolite is such that the catalyst constituted by the zeolite and 0.5% of platinum results in, for a conversion of the order of 95% by weight of n-heptadecane (n-C17), a selectivity for isomerised products of 70% or more, preferably at least 80%, under standard isomerisation test (SIT) conditions for n-C17 which are defined below. The isomerised products generally contain between about 65% and 80% by weight of single-branched products and between about 20% and 35% by weight of multi-branched products, essentially two-branched products. The term "single-branched products" means linear paraffins containing a single methyl group, and the term "two-branched products" means linear paraffins containing two methyl groups which are not carried by the same carbon atom. Multi-branched products are defined by extension. The hydroisomerisation is thus selective.

The catalyst comprises at least one hydro-dehydrogenating function provided by at least one hydro-dehydrogenating element selected from the group formed by non noble group VIII metals, group VIB metals, and niobium, and the reaction is carried out under the conditions described below.

We have surprisingly discovered that one of the determining factors for obtaining high selectivities for isomerised products is the use of molecular sieves which are characterized in that the largest pore openings are delimited by 10 oxygen atoms;

the bridging distance must be less than 0.70 nm, preferably in the range 0.50 nm to 0.68 nm, more preferably in the range 0.52 nm to 0.65 nm.

This latter point in particular is in contrast to that claimed in the prior art patents cited above such as WO 92/01657 which cites as an essential feature a range of pore sizes for obtaining good yields of isomerised products.

The bridging distance was measured using a drawing and molecular modelling tool such as Hyperchem or Biosym, which allows the surface of the molecular sieves in question to be constructed and, using the ionic radii of the elements present in the framework of the sieve, allows the bridging distance to be measured.

The use of such molecular sieves of the invention under the conditions described above can in particular enable the production of products with a low pour point and high viscosity index in good yields.

DETAILED DESCRIPTION OF THE INVENTION

The molecular sieves of the invention which can be used for isomerising linear or slightly branched paraffin hydrocarbons are zeolites, crystalline aluminosilicates such as Theta-1, NU-10, NU-23, EU-13, in which the Si/Al ratio is that which is best suited for the desired application. The zeolites of the invention include NU-87 which, of course, contains pores delimited by 10 and 12 oxygen atoms, but accessibility to the latter is via 10 oxygen atom pore openings. Derivatives of the above zeolites comprising at least one heteroatom such as B, Fe, Ga, or Zn in the zeolitic framework, are also included in the scope of the invention.

The NU-10 zeolite used in the process of the invention and its synthesis method have been described in European patent EP-A-0 077 624. This NU-10 zeolite is characterized by the following X ray diffraction table:

| X ray diffraction table for NU-10 zeolite | |
|---|---|
| d (A) | I/I$_0$ |
| 10.95 ± 0.25 | m to s |
| 8.80 ± 0.14 | w to m |
| 6.99 ± 0.14 | w to m |

-continued

| X ray diffraction table for NU-10 zeolite | |
|---|---|
| d (A) | I/I$_0$ |
| 5.41 ± 0.10 | w |
| 4.57 ± 0.09 | w |
| 4.38 ± 0.08 | vs |
| 3.69 ± 0.07 | vs |
| 3.63 ± 0.07 | vs |
| 3.48 ± 0.06 | m to s |
| 3.36 ± 0.06 | w |
| 3.31 ± 0.05 | w |
| 2.78 ± 0.05 | w |
| 2.53 ± 0.04 | m |
| 2.44 ± 0.04 | w |
| 2.37 ± 0.03 | w |
| 1.88 ± 0.02 | w | w = weak (I/I$_0$ in the range 0 to 20); m = medium (I/I$_0$ in the range 20 to 40); s = strong (I/I$_0$ in the range 40 to 60); vs = very strong (I/I$_0$ in the range 60 to 100).

NU-10 zeolite has an Si/Al atomic ratio in the range 8 to 1000.

It has been observed that the zeolites of the catalysts of the invention are characterized by a catalytic test known as the standard isomerisation test (SIT) of pure n-heptadecane which is carried out at a partial pressure of 150 kPa of hydrogen and a partial pressure of n-C17 of 0.5 kPa, giving a total pressure of 150.50 kPa, in a fixed bed with a constant n-C17 flow rate of 15.4 m/h and a catalyst mass of 0.5 g. The reaction is carried out in upflow mode. The degree of conversion is regulated by the temperature at which the reaction is carried out. The catalyst which undergoes this test is constituted by pure pelletized zeolite and 0.5% by weight of platinum.

Under these conditions, a molecular sieve of the invention must produce, for a degree of conversion of n-C17 of the order of 95% by weight (the degree of conversion being regulated by temperature), a selectivity for isomerised products of 70% by weight or more, preferably at least 80% by weight.

The isomerisation selectivity for the standard n-C17 isomerisation test (SIT$_{n-C17}$) is defined as follows:

$$\text{Isomerisation selectivity (\%)} = \frac{\text{mass of isomerised } C17 \text{ products (single- and multi-branched) in test}}{\text{mass of isomerised } C17 \text{ products in test} + \text{mass of } C17 \text{ products in test}} \times 100$$

at a n-C17 conversion of the order of 95%.

The C17 products are compounds containing less than 17 carbon atoms, regardless of their degree of branching.

The sieve generally contains at least one hydro-dehydrogenating element which is introduced into the molecular sieve, for example by dry impregnation, ion exchange or any other method which is known to the skilled person.

The amount of hydro-dehydrogenating metal(s) introduced, expressed as the weight % with respect to the mass of molecular sieve used, is at least 5%.

The hydro-dehydrogenating function is preferably provided by at least one group VIII metal or metal compound such as cobalt or nickel. A combination of at least one metal or metal compound from group VI (in particular molybdenum or tungsten) and at least one metal or metal compound from group VIII (in particular cobalt or nickel) of the periodic table can be used. The total concentration of metal oxides from groups VI and/or VIII is in the range 6.4% to 40% by weight, preferably in the range 7% to 40%, advantageously in the range 8% to 40%, or 10% to 40%, and most preferably 10% to 30% by weight, and the weight ratio expressed as the metal oxide of the group VI metal (or metals) over the group VIII metal (or metals) is in the range 1.25 to 20, preferably in the range 2 to 10. Further, this catalyst can contain phosphorous. The phosphorous content, expressed as the concentration of phosphorous oxide $P_2O_5$ is generally less than 15% by weight, preferably less than 10% by weight.

The hydrogenating function itself as defined above (group VIII metals or a combination of group VI and group VIII metal oxides) can be introduced into the catalyst at various stages of the preparation and in a variety of manners.

It can be introduced only in part (for combinations of group VI and VIII metal oxides) or completely on mixing the molecular sieve of the invention with the gel of the oxide selected as the matrix. It can be introduced by one or more ion exchange operations carried out on the calcined support constituted by the molecular sieve of the invention dispersed in the selected matrix, using solutions containing precursor salts of the selected metals when these are in group VIII. It can be introduced by one or more impregnation operations carried out on the formed and calcined support, using a solution of precursors of oxides of group VIII metals (such as cobalt and nickel) when the precursors of the oxides of group VI metals (such as molybdenum and tungsten) have been introduced first on mixing the support. Finally, it can be introduced by one or more impregnation operations carried out on the calcined support constituted by a molecular sieve of the invention and a matrix, using solutions containing the precursors of the oxides of metals from groups VI and/or VIII, the precursors of oxides of group VIII metals preferably being introduced after those of group VI or at the same time as the latter.

When the metal oxides are introduced in a plurality of impregnation steps for the corresponding precursor salts, an intermediate calcining step must be carried out on the catalyst at a temperature which is in the range 250° C. to 600° C.

Molybdenum impregnation can be facilitated by adding phosphoric acid to solutions of ammonium paramolybdate.

The mixture is then formed, for example by extrusion through a die. The molecular sieve content in the mixture obtained is generally in the range 0.5% to 99.9%, advantageously in the range 10% to 90% by weight with respect to the mixture (molecular sieve+matrix), preferably in the range 20% to 70%.

In the remainder of the text, the term "support" means the molecular sieve+matrix mixture.

Forming can be carried out with matrices other than alumina, such as magnesia, amorphous silica-aluminas, natural clays (kaolin, bentonite, sepiolite, attapulgite) and by techniques other than extrusion, such as pelletization or bowl granulation.

Deposition of the final metal is generally followed by calcining in air or oxygen usually between 300° C. and 600° C., for 0.5 to 10 hours, preferably between 350° C. and 550° C. for 1 to 4 hours.

It is then generally followed by sulphurisation of the catalyst before bringing it into contact with the feed, using any method which is known to the skilled person. The catalyst thus advantageously contains sulphur.

Feeds which can be treated using the process of the invention are advantageously fractions with relatively high pour points which are to be reduced.

The process of the invention can be used to treat a variety of feeds from relatively light fractions such as kerosines and jet fuels to feeds with higher boiling points such as middle distillates, vacuum residues, gas oils, middle distillates from FCC (LCO and HCO) and hydrocracking residues.

The feed to be treated is usually a C10+ cut with a boiling point of more than about 175° C., or a C20+ cut with an initial boiling point of more than 315° C., and preferably a heavy cut with an initial boiling point of at least 380° C. The process of the invention is particular suitable for treating paraffinic distillates such as middle distillates which encompasses gas oils, kerosines, jet fuels and all other fractions with a pour point and viscosity which have to be adjusted to fall within the specifications.

Feeds which can be treated using the process of the invention may contain paraffins, olefins, naphthenes, aromatics and heterocycles and with a large proportion of high molecular weight n-paraffins and very slightly branched paraffins, also of high molecular weight.

The reaction can be carried out so that the percentage of cracking reactions remains sufficiently low to render the process economically viable. The degree of cracking reactions is generally less than 20% by weight.

Typical feeds which can advantageously be treated using the invention generally have a pour point of above 0° C., routinely above 15° C. The products resulting from the treatment of the process have pour points of below 0° C., preferably below about −10° C.

The concentrations of n-paraffins (n-alkanes) containing more than 10 carbon atoms with high molecular weights and of very slightly branched paraffins containing more than 10 carbon atoms and also with high molecular weights are above 30% and up to about 90%, in some cases over 90% by weight. The process is of particular importance when this proportion is at least 60% by weight.

Non limiting examples of other feeds which can be treated using the invention are bases for lubricating oils, synthesised paraffins from the Fischer-Tropsch process, polyalphaolefins with high pour points, synthesised oils, etc. . . . . The process is also suitable for other compounds containing an n-alkane chain as defined above, for example n-alkylcycloalkanes, or containing at least one aromatic group.

The operating conditions for carrying out hydroisomerisation in the process of the invention are as follows:
- the reaction temperature is in the range 170° C. to 500° C., preferably in the range 180° C. to 450° C., advantageously 180° C. to 400° C.;
- the pressure is in the range 1 to 250 bars, preferably in the range 10 to 200 bars;
- the hourly space velocity (HSV, expressed as the volume of feed injected per unit volume of catalyst per hour) is in the range about 0.05 to about 100, preferably about 0.1 to about 30 h$^{-1}$.

The feed and catalyst are brought into contact in the presence of hydrogen. The amount of hydrogen used, expressed in liters of hydrogen per liter of feed, is in the range 50 to about 2000 liters of hydrogen per liter of feed, preferably in the range 100 to 1500 liters of hydrogen per liter of feed.

The feed to be treated preferably has a nitrogen compound content of less than about 200 ppm by weight, preferably less than 100 ppm by weight. The sulphur content is less than 1000 ppm by weight, preferably less than 500 ppm and more preferably less than 200 ppm by weight. The metal content in the feed, such as Ni or V, is extremely low, i.e., less than 50 ppm by weight, preferably less than 10 ppm by weight, more preferably less than 2 ppm by weight.

The compounds obtained by the process of the invention are essentially single-branched, two-branched and multi-branched with methyl groups. As an example, for a feed constituted by pure n-heptadecane (n-C17), methylhexadecane compounds are selectively obtained, mainly 2-methylhexadecane, and two-branched compounds: 2,7-; 2,8-; 2,9-; 2,10- and 2,11-dimethylpentadecane. The ensemble of isomerised products represents more than 70% by weight of the products obtained at 95% by weight conversion. The isomerised carbon atoms are separated by a distance at least equal to the bridging distance.

The following examples illustrate the invention without in any way limiting its scope. They are given for a feed constituted by n-heptadecane (standard isomerisation test, SIT) or a hydrocracking residue.

EXAMPLE 1

Catalyst C1, in Accordance With the Invention

The starting material used was a NU-10 zeolite in its H form, which had a global Si/Al ratio of about 30, pore openings delimited by 10 oxygen atoms and a bridging distance, i.e., a distance between two pore openings, of 0.55 nm. The NU-10 zeolite crystallites were in the form of needles with a length of less than 1 $\mu$m and a cross section in the range 0.1 to 0.4 $\mu$m.

The NU-10 zeolite was mixed with type SB3 alumina supplied by Condéa. The mixed paste was extruded through a 1.4 mm die. The extrudates were dry impregnated using a solution of a mixture of ammonium heptamolybdate, nickel nitrate and orthophosphoric acid, and finally calcined in air at 550° C. in-situ in the reactor. The weight contents of the active oxides were as follows (with respect to the catalyst):

5.2% by weight of phosphorous oxide $P_2O_5$;

15.2% by weight of molybdenum oxide $MoO_3$;

2.8% by weight of nickel oxide NiO.

The NU-10 zeolite content in the whole of the catalyst was 60%.

Evaluation of Catalyst for Hydroisomerisation of a Hydrocracking Residue from a Vacuum Distillate.

The characteristics of the feed were as follows:

| Sulphur content (ppm by weight) | 98 |
| Nitrogen content (ppm by weight) | 12 |
| Pour point (° C.) | +36 |
| Initial boiling point | 369 |
| 5% | 422 |
| 10% | 438 |
| 50% | 477 |
| 90% | 489 |
| 95% | 524 |
| End point | 549 |

The catalytic test unit comprised a fixed bed reactor operated in upflow mode into which 80 ml of catalyst was introduced. Each of the catalysts was sulphurised using a mixture of n-hexane/DMDS+aniline up to 350° C. The total pressure was 12 MPa, the hydrogen flow rate was 1000 liters of gaseous hydrogen per liter of injected feed, and the hourly space velocity was 1.0 $h^{-1}$.

The reaction was carried out at 300° C., at a total pressure of 12 MPa, an hourly space velocity of 1.1 $h^{-1}$ and a hydrogen flow rate of 1000 l of $H_2$ per liter of feed.

The characteristics of the oil after hydroisomerisation are shown in the following table.

| Viscosity index VI | 112 |
| Pour point (° C.) | −18 |
| Oil/feed yield (weight %) | 77 |

This example shows the importance of using a catalyst of the invention, which can reduce the pour point of the initial feed in the case of a hydrocracking residue, while keeping the viscosity index (VI) high.

The present invention has been illustrated for the production of an oil, but other aims can be achieved. In general, the invention will be used to obtain multiple, localised branching.

What is claimed is:

1. A process for selective hydroisomerisation of compounds containing at least one n-alkane chain containing more than 10 carbon atoms, comprising contacting said compound with hydrogen in contact with a catalyst comprising a matrix, at least 5% by weight of at least one hydro-dehydrogenating element selected from the group consisting of non noble group VIII metals, group VIB metals, and niobium, and a zeolite selected from the group consisting of Nu-23, Nu-87 and Eu-13.

2. A process according to claim 1, wherein the zeolite is Nu-23.

3. A process according to claim 1, wherein the zeolite is Nu-87.

4. A process according to claim 1, wherein the zeolite is Eu-13.

5. A process according to claim 1, wherein the molecular sieve contains gallium, boron or zinc.

6. A process according to claim 1, in which the pressure is in the range 1 to 250 bars, the temperature is in the range 170° C. to 500° C., the hourly space velocity is in the range 0.05 to 100 $h^{-1}$, and the hydrogen flow rate is in the range 50 to 2000 l of hydrogen/l of feed.

7. A process according to claim 1, in which the compound to be treated is selected from the group consisting of n-alkanes, n-alkylcycloalkanes and compounds containing at least one aromatic group.

8. A process according to claim 1, in which the compound to be treated is present in a feed with an initial boiling point of more than 175° C.

9. A process according to claim 1, in which the compound to be treated is present in a feed with an initial boiling point of at least 380° C.

10. A process according to claim 1, in which the compound to be treated is present in a hydrocarbon feed selected from the group consisting of middle distillates, vacuum residues, hydrocracking residues, paraffins from the Fischer-Tropsch process, synthesis oils, gas oil cuts, FCC middle distillates, lubricant stock and polyalphaolefins.

11. A process according to claim 1, wherein the catalyst also contains phosphorous.

* * * * *